Nov. 29, 1949 N. A. TUCKER ET AL 2,489,994
WELDING METALLIC TIPS TO BASES
Filed Jan. 21, 1949 7 Sheets-Sheet 1

FIG. 1.

Inventors
Norman Albert Tucker
John Ernest Wall
By their attorneys

Howson and Howson

Inventors:
Norman Albert Tucker
John Ernest Wall
By their attorneys

Howson and Howson

Nov. 29, 1949 N. A. TUCKER ET AL 2,489,994
WELDING METALLIC TIPS TO BASES
Filed Jan. 21, 1949 7 Sheets-Sheet 7

Inventors
Norman Albert Tucker
John Ernest Wall
By their attorneys

Howson and Howson

Patented Nov. 29, 1949

2,489,994

UNITED STATES PATENT OFFICE 2,489,994

WELDING METALLIC TIPS TO BASES

Norman Albert Tucker and John Ernest Wall, London, England, assignors to Johnson, Matthey & Company Limited, London, England, a British company Application January 21, 1949, Serial No. 71,944
In Great Britain January 28, 1948

12 Claims. (Cl. 219—4)

1

This invention relates generally to improvements in and relating to welding and more particularly to the welding of metallic tips to metallic bases, such as metallic tips to pen nibs.

The principal object of the invention is to provide an improved method of welding which is simple and efficient and which, at the same time, enables a high rate of production of welded articles to be continuously maintained, thereby rendering the manufacture of such articles on a quantity basis economically possible.

Another object is to provide a method which combines accuracy with high speed, whereby the percentage of rejects amongst a given number of such articles is reduced to a minimum.

A further object of the invention is to provide a compact apparatus for carrying out the improved method, which may be under the control of a single operator and the rate of output of welded articles from which is to a large extent determined by the speed of the operator.

A still further object is to provide a welding apparatus which functions automatically and which, once set in motion, only requires to be continuously supplied with untreated blanks.

Yet another object of the invention is to provide a method of welding a metallic tip to a metallic base which comprises mechanically constraining the base to move bodily through a predetermined angular path and automatically temporarily stopping the movement of said base at at least two predetermined positions along its path, at one of which positions a tip is brought into contact with the base and welded thereto and at another of which positions said base, with tip attached, is displaced from said angular path.

Another object is to provide an apparatus for welding a metallic tip to a metallic base, which comprises the combination of an angularly displaceable base holding device, a displaceable tip supporting device and means for withdrawing a base from said holding device located at spaced positions along the angular path of movement of said device; a welding circuit including said base holding device and said tip-supporting device; and common operating means for moving said base holding device progressively to each of said positions in turn and for causing or allowing the displacement of said tip-supporting device when said base-holding device reaches the first position to bring a tip carried by said support into contact with a base and close the welding circuit and for actuating said withdrawing means to allow said base to be withdrawn from

2 said holding device when the latter reaches the second position.

For a full and clear understanding of the invention, reference will now be directed to the accompanying drawings, which illustrate, solely by way of example, apparatus, embodying the features of the invention, for the welding of metallic tips to pen nibs, it being understood that the invention is in no way limited to this example, which is merely illustrative of one application of the invention, the scope of which is clearly defined in the appended claims.

Figure 1:
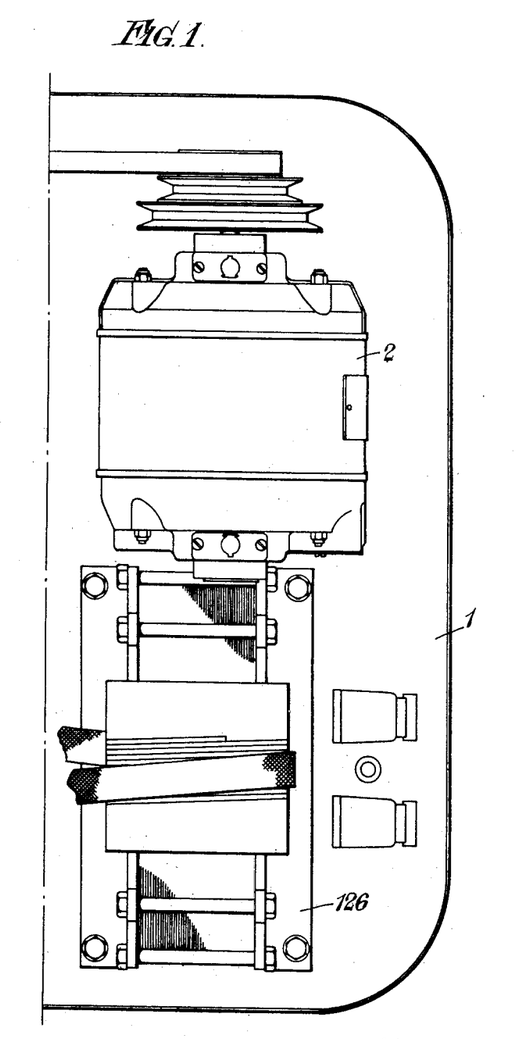
Figures 1 and 1A are top plan views of the right half and left half respectively of apparatus for continuously welding metallic tips to pen nibs and embodying the features of the invention.
Figure 1A:
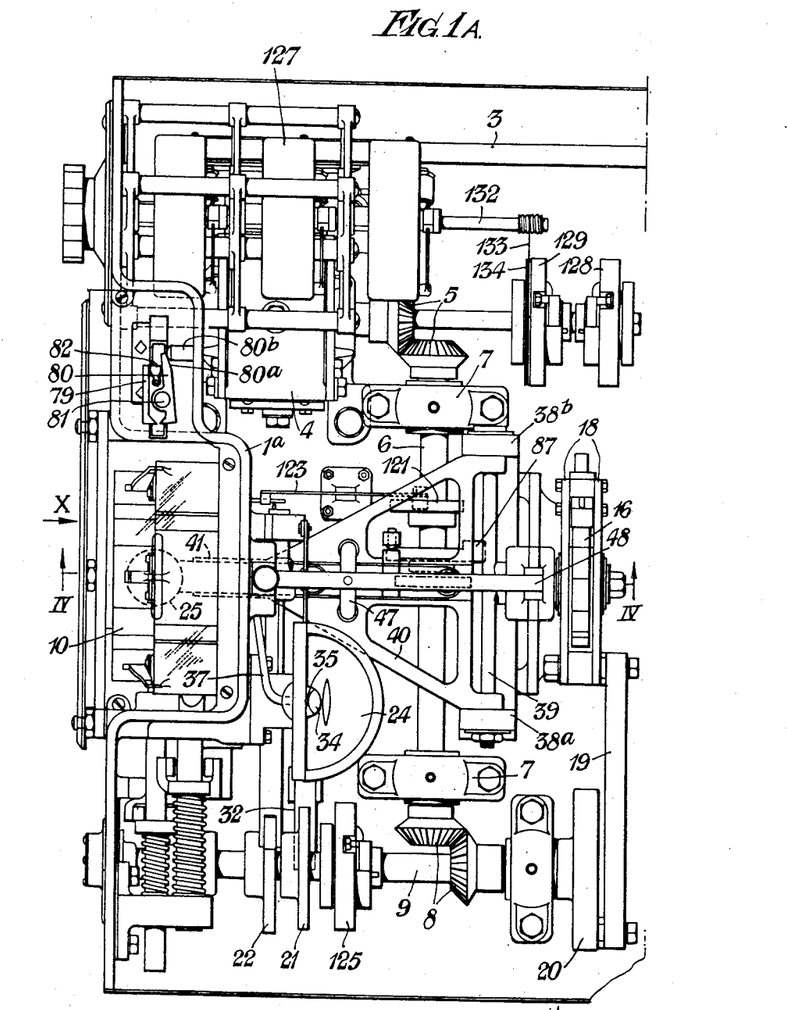
Figure 2:
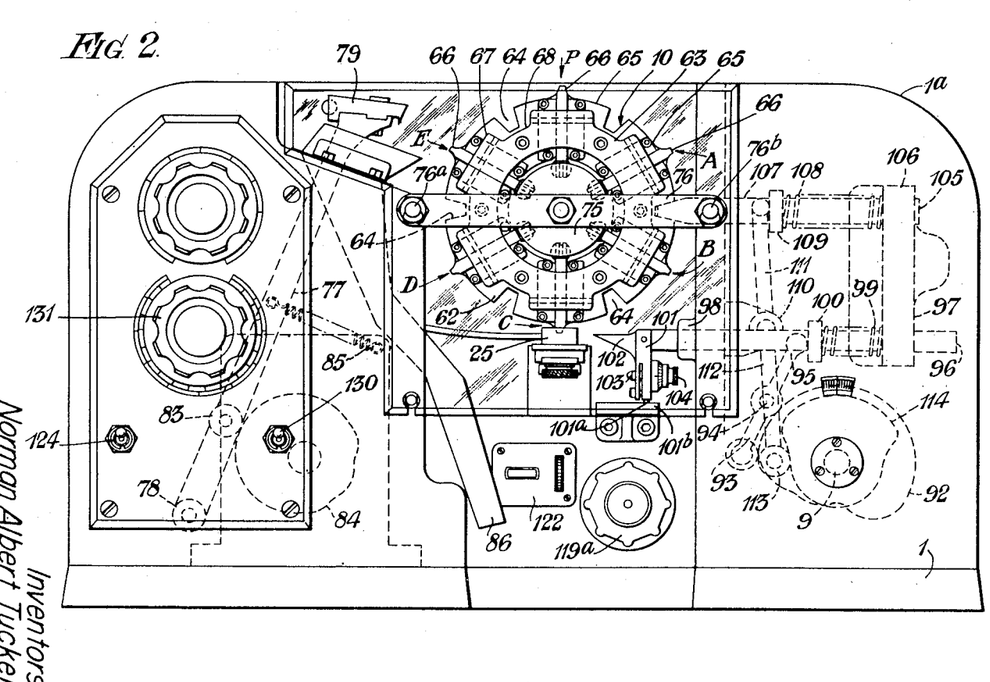
Figure 2 is a front elevational view thereof looking in the direction of the arrow X, Figure 1.
Figure 3:
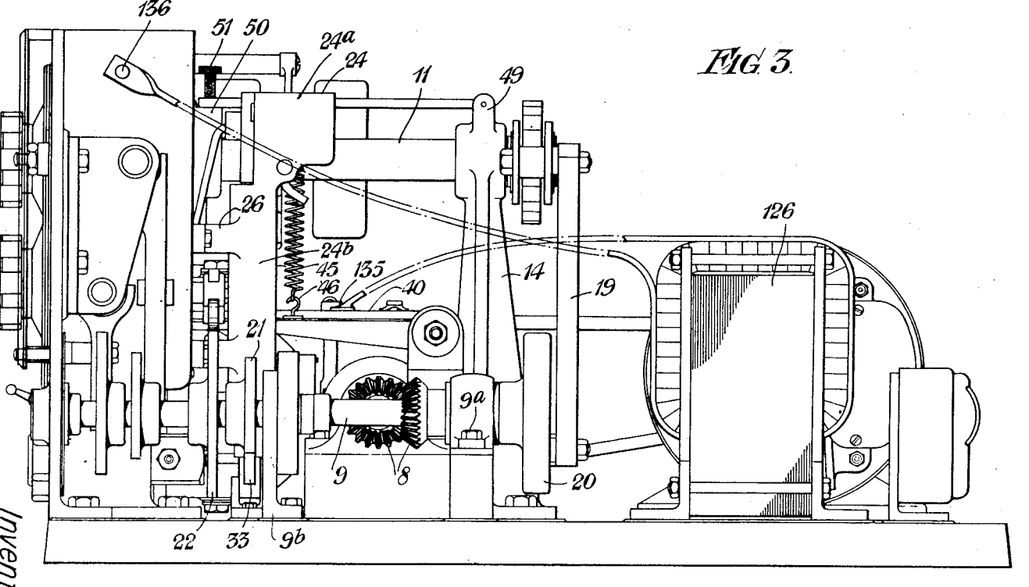
Figure 3 is a side view of the apparatus looking in the direction of the arrow Y, Figure 1.

Referring first to Figures 1-3 of the drawings, the apparatus consists essentially of a main frame comprising a base 1 and a front side 1a. On the base 1 is mounted an electric motor 2 which drives, through the medium of belt 3, reduction gear-box 4 and bevel-gears 5, a transversely arranged shaft 6, rotatably mounted in bearings 7 mounted on the base 1. The said shaft 6 drives, through the medium of intermeshing bevel-gears 8, a main driving shaft 9 rotatably mounted in bearings 9a and 9b. Rotation of the shaft 9 causes the actuation of a rotatable turret designated generally as 10, see particularly Figures 2 and 4, and carrying six nib-holding devices or clamps, and also of the various mechanisms, to be described in detail hereafter, for effecting the welding of a tip to a nib in accordance with the method of the invention. The turret 10, which is formed as a circular drum, is mounted at the forward end of a shaft 11 rotatably mounted in bearings 12 and 13 formed in a vertically extending frame member 14 carried by the base 1 and in the front member 1a.

Ratchet drive

Figure 6:
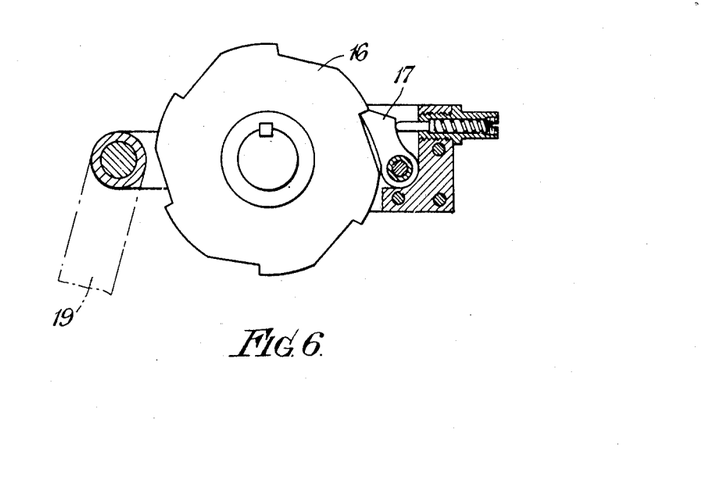
Figure 6 is a view, partly in section, of a detail portion of the mechanism.

The shaft 11 extends rearwardly of the frame member 14 in a portion 15 and has mounted thereon a ratchet wheel 16 having six teeth thereon with which cooperates a pawl 17 (Figure 6) carried by a rocking frame 18 actuated by a rod 19 and eccentric 20 mounted on the said driving shaft 9.

Hopper and operating mechanism

On the shaft 9, intermediate the ends thereof, are arranged two cams 21, 22, (Figure 3) the cam 21 controlling the supply of tips 23 from a hopper 24, and the cam 22 controlling the movement of a tip-supporting cup 25.

Figure 4:
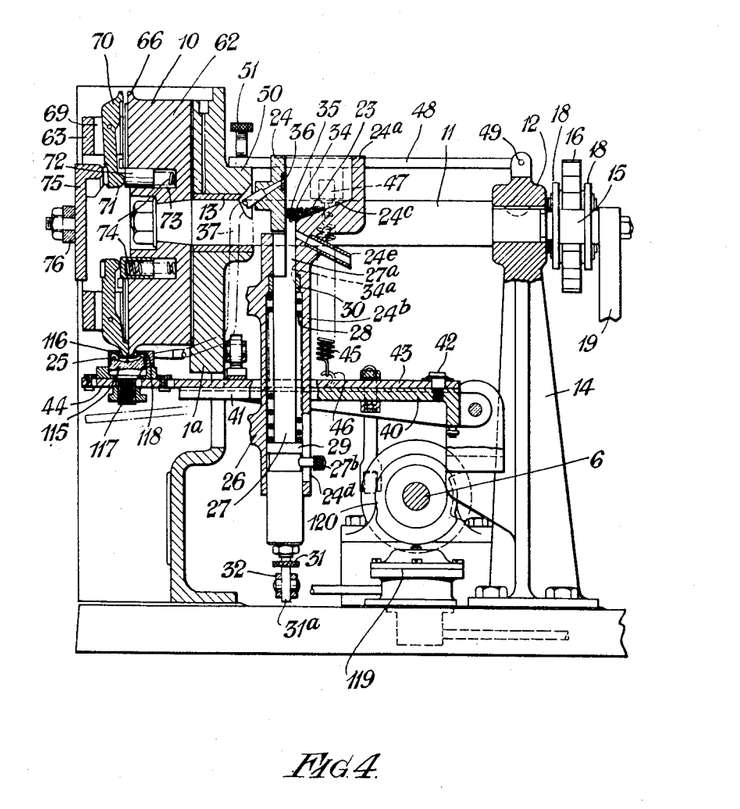
Figure 4 is a vertical section of part of the apparatus taken on the line 4—4 of Figure 1.

The hopper 24, see Figure 4, comprises an open semi-circular receptacle 24a for containing the tips 23 and a downwardly extending open-bottomed tubular portion 24b having lateral flanges 26 bolted to the rear of the front member 1a of the frame. The tubular portion 24b forms a cylinder in which is slidable a plunger 27 against the action of a coil spring 28 surrounding the plunger 27 and contained between a collar 29 formed on the plunger 27 and an abutment 30 in the cylinder 24b. The plunger 27 extends beyond the open end of the portion 24b and carries at the lower end thereof a tappet 31 engaging a roller 31a on one end of a rocking arm 32, the other end of which carries a roller 33 engaged by the aforesaid control cam 21. The plunger 27 is normally retained in its lowered position by the spring 28, with the roller 33 in engagement with the cam 21. The upper end portion 27a of the plunger 27 extending into the receptacle 24a is of reduced diameter and the tip thereof is formed over a portion 34 of the surface thereof to correspond to the surface of a cone, the tip proper being formed as a groove or recess 35 adapted to receive a single metallic tip 23. The purpose of this construction will be explained hereafter. The bottom 24c of the receptacle is inclined downwardly towards the plunger 27 to maintain the tips 23 in contact therewith.

For the purpose of enabling the hopper 24 to be emptied of tips when required, the plunger 27 is provided with a longitudinal groove 34a, which is located during normal operation of the plunger 27 beneath the bottom outlet of the receptacle 24a. The plunger 27 may, however, be manually raised beyond its normal upper limit, when the apparatus is at rest, by means of a hand lever or knob 27b, projecting laterally from the lower portion of the plunger 27 and sliding in a slot 24d provided in the tubular portion 24b for this purpose. When the plunger 27 is so raised, the groove 34a rises above the bottom edge of the receptacle 24a and allows tips to fall therein and into an outlet pipe 24e from which the tips will be discharged for collection.

From the outlet 36 of the hopper 24 extends a pipe 37 leading to the tip-supporting cup 25, the construction of which and of the parts pertaining thereto will now be described.

Cup-operating means

In spaced bearings 38a and 38b (Figure 1), mounted on the base 1, beneath, and one on either side of, the shaft 11, is supported a horizontal rod 39 on which is vertically swingably mounted one end of a V-shaped member 40, the apex of which terminates in a straight portion 41 extending forwardly partly beneath the vertical axis of the turret 10. On the upper side of this member 40 is mounted, on a screw pivot 42, an arm 43 so as to be swingable in a horizontal plane to some extent on either side of the central longitudinal axis of the member 40 (see Figures 4 and 5). This arm 43 projects beyond the forward end of the portion 41 and carries, adjacent the outer end 44 thereof, on its upper surface the aforesaid cup 25. The cup 25 is so positioned on the arm end 44 that, in the uppermost position of the member 40 it lies vertically beneath the rotary path of a nib supporting member, to be later described, carried by the turret 10. The member 40 is normally held in its uppermost position under the action of a pair of oppositely disposed coil springs 45, (Figures 3, 4 and 5) one end of each of which is detachably secured to the member 40, as at 46 (Figures 4 and 5) and the other end of each of which is detachably secured to one end of a yoke 47 supported centrally beneath a horizontal forwardly extending rod 48 pivotally mounted at one end thereof in a forked extension 49 formed on the member 14 and resting, at the other end, on an abutment 50 integral with the rear face of the front frame member 1a (Figures 3 and 4). A set-screw 51 is provided to enable the tension of the springs 45 to be varied as desired.

Figure 5:
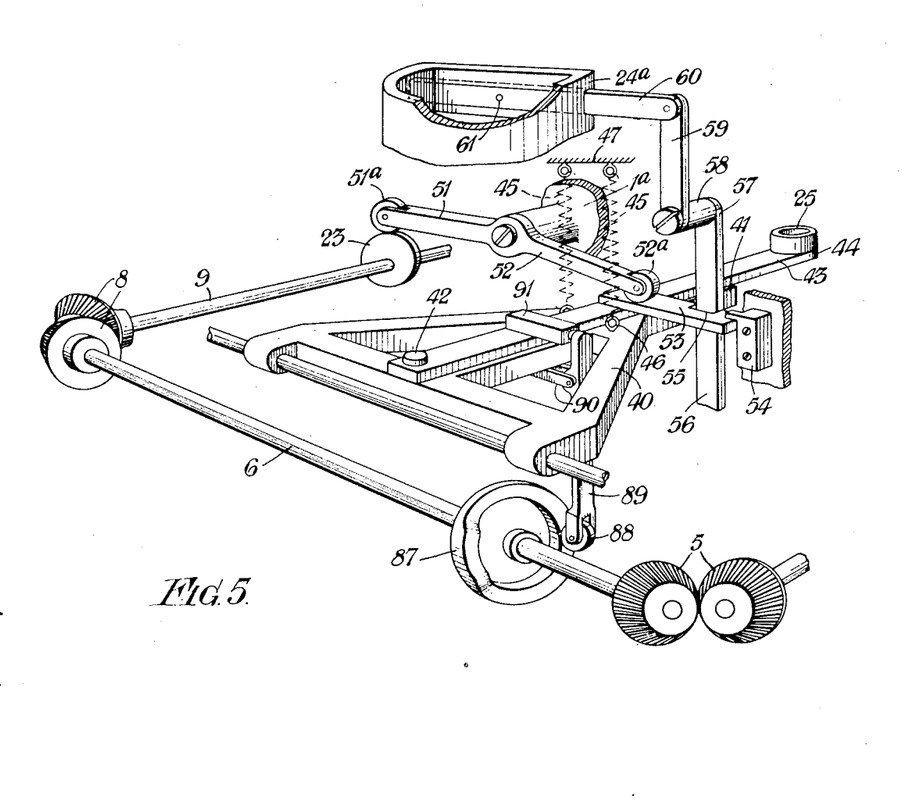
Figure 5 is a perspective view of part of the apparatus showing the mode of operation of the tip-supporting means.

Referring now more particularly to Figure 5, the member 40 is swung in a downward direction, so as to lower the cup 25 against the action of the springs 45, by means of the aforesaid cam 23 by means of a double-armed lever 51, 52, pivotally mounted at its centre on the frame member 1a, the arm 51 carrying at its forked extremity a roller 51a, which engages the cam 23, and the arm 52 carrying at its forked extremity a roller 52a which bears on a laterally projecting arm 53 secured to the member 40. The arm 53 is adapted in one extreme lateral position of the cup-carrying arm 43 to engage beneath a fixed stop 54, the purpose of which will become clear as the description proceeds. The arm 53 is formed with a slot 55 through which extends a vertical rod 56 pivoted at its upper end 57 to the frame member 1a and carrying a rearwardly projecting pin 58 to which is secured the lower end of an upwardly extending lever 59, to the upper end of which is fulcrumed a slide bar 60 having a slot 61 therein and slidably engaging the hopper receptacle 24a. Movement of the slide 60 under the action of the arm 53 brings the slot 61 into and out of register with the hopper outlet 36 as required.

Turret

Referring now to the nib-holding drum or turret 10, it will been seen from Figures 2 and 4 that it consists of a rear circular drum member 62 and a front ring-like member 63 fixedly mounted thereon. The periphery of the drum 62 is provided with six uniformly spaced slots 64 (Figure 2) dividing the periphery of the drum into six segmental portions 65, each of which is formed flush with the front face of the drum with a centrally radially extending integral projection 66 forming the fixed jaw of a nib-holding clamp. The outer ring member 63 is likewise formed with six evenly-spaced radial segmental portions 67 (Figure 2) of a radius less than that of the segments 65 with interconnecting web portions 68 of lesser radius than the segments 67. Each segmental portion 68 is slotted as at 69 (Figure 4) throughout the depth of the ring 63 and in the slot is pivotally mounted a movable jaw member 70, the outer end of which cooperates with the fixed projection 66 to form a nib-clamping device.

The inner end of each jaw 70 is formed with an abutment 71 which is engaged by a pin 72 slidably mounted in a slot 73 formed in the drum 62 and normally urged outwardly of the slot 73 by means of a spring 74 so as to close the jaws 70 and 66. The jaws 70 are pivoted in an opening direction against the action of their springs 74 by means of a fixed face cam 75 mounted on a bar 76 (Figure 2) extending transversely across the front of the ring-member 63 and bolted at its ends to the aforesaid frame member 1a at 76a and 76b.

Nib withdrawing device

Referring now to Figures 1 and 2, on the upper end of a lever arm 77, pivoted at its lower end, at 78, to the frame member 1a is mounted a nib-withdrawing device comprising a fixed jaw 79 and a movable jaw 80, pivoted at 81. A light leaf-spring 82 is provided for normally maintaining the jaws closed. The rear end of the movable jaw 80 is provided with a bevelled surface 80a, which rides over a fixed pin 80b in the retracted position, thereby opening the jaws. The arm 77 (Figure 2) carries a roller 83 adapted to engage a cam 84 and held in contact therewith by means of a spring 85. The cam 84 is mounted on a forward extension of the gear box drive shaft on which the driving pinion 5 is mounted, and is so contoured as normally to maintain the lever arm 77 in the retracted position shown in Figure 2, but to allow the said arm to swing downwardly to the right so as to bring the jaws 79 and 80 close to the turret 10. 86 is a chute for delivering the nibs after tipping.

Cup-centering means

As previously explained, the cup 25 is laterally displaceable on either side of its vertical path of reciprocation. This is for the purpose of ensuring that a tip 23 carried by the cup 25 shall be accurately aligned or centered beneath a nib carried by a clamp 66, 70. This is achieved by arranging that the arm 43 carrying the cup 25 is positively displaced, when in its lowered position, from the central position of Figure 2 to the right of that figure and then positively displaced, prior to the next upward movement, to the left and accurately centered with respect to the axis of a nib carried by the turret 10.

Displacement of the cup 25 to the right is effected by means of a face cam 87 (Figure 5) mounted on the aforesaid intermediate shaft 6, engaging a roller 88 carried at the lower end of an upwardly extending arm 89 pivotally mounted intermediate its ends, as at 90, to the member 40 and slidingly bearing at its upper end against a lateral projection 91.

Realignment of the cup 25 is effected by means of a cam 92, shown dotted in Figure 2, which acts on one arm 93 of a two-armed lever pivoted at 94 to the frame member 1a and the other arm 95 of which is forked and embraces, and is coupled to, a horizontal rod 96 slidably mounted in bearings 97 and 98 provided on the rear of the frame member 1a. The arm 93 acts to withdraw the rod 96 to the position shown in dotted lines in Figure 2 against the action of a coil spring 99 surrounding the said rod between the bearing 97 and a fixed collar 100. The rod 96 carries at its inner end a depending member 101 having a pointed finger 102 adapted to engage a nib held in a clamp 66, 70 and a stop 103, adjustable by means of a vernier control 104 and adapted to engage the cup 25. The lower end of the member 101 is provided with a spigot or projection 101a slidable in a guide 101b secured to the frame 1a.

Turret-locking device

For the purpose of locking the turret 10 temporarily against inadvertent movement at each inoperative period of its intermittent rotation, that is to say, when any one of the clamps 66, 70 reaches the welding position in the vertical line of reciprocation of the cup 25, a horizontal rod 105 is provided which is slidable in bearings 106 and 107 provided on the rear of the frame member 1a on the line of the horizontal diameter of the drum 62 of the turret 10. A coil spring 108 surrounds the rod 105 between the bearing 106 and a fixed collar 109 on the rod, which spring urges the said rod 105 in a direction to engage one of the aforesaid slots 64 in the drum 62. Pivoted to the frame member 1a at 110 is a two-armed lever, one arm 111 of which pivotally engages the rod 105 and the other arm 112 of which carries a roller 113 engaging a cam 114 mounted on the aforesaid driving shaft 9.

Details of cup construction

As shown in Figure 4, the cup 25 comprises a main tip-supporting member 115 having a concave upper face 116 for the reception of a tip and an external annular flange 117 supporting a cover or sheath 118, which is so dimensioned as to define a space to which hydrogen can be supplied from any suitable source of hydrogen supply, not shown in the drawing, through the medium of a control valve 119 actuated, as required, by a cam 120 fixed on the shaft 6. 119a represents a control knob for a reducing valve, not shown, included in the hydrogen supply circuit.

Also mounted on the shaft 6 is a further cam 121, which actuates a counter mechanism, indicated at 122 in Figure 2, through the medium of a rod 123.

In the circuit of the driving motor 2 is included a main switch 124 (Figure 2) and a contact breaker 125 mounted on the main shaft 9.

Figure 7:
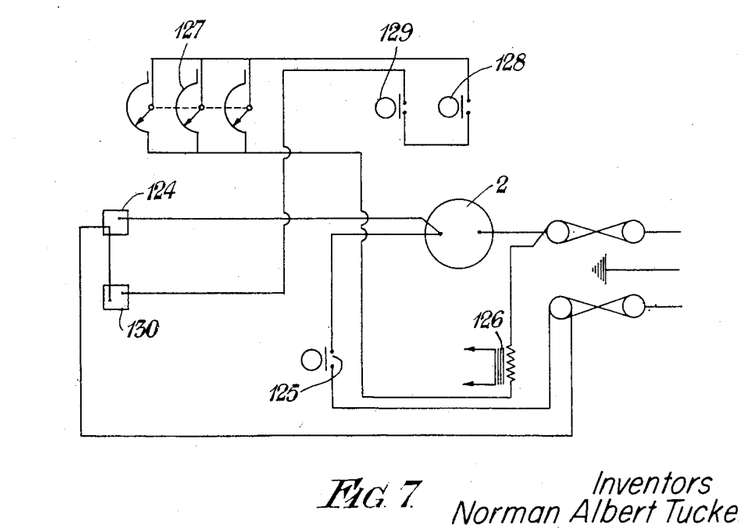
Figure 7 is a wiring diagram showing the electrical connections for the motor and welding circuits.

On the base 1 is mounted a step-down transformer 126, Figure 1, the primary winding of which is connected to a suitable source of current supply and is in series with a rheostat 127, a fixed contact breaker 128 and a movable contact breaker 129, mounted on the gear-box shaft, a switch 130 and the motor switch 124. The contact breakers 128 and 129 are of any well-known construction and do not require further description. The movable contact breaker 129 is operable so as to vary the length of time during which the welding circuit is closed, by means of a manual control knob 131 mounted on the outer end of a spindle 132 passing through the frame member 1a and the inner end of which is coupled to the member 129 by means of a cord 133 passing therearound and round a groove 134 formed on the member 129. The secondary winding of the transformer is connected, as clearly shown in Figure 3, to the cup-carrying member 40 at 135 and to the frame member 1a at 136. A wiring diagram of the electrical connections for the motor and welding circuits is shown in Figure 7, which is self-explanatory.

Operation of the machine

The above described apparatus operates in the following manner:

Let it be assumed that the parts are in the position shown in Figure 2, that is to say, that a particular clamp 66, 70, on the turret 10, which clamp, for the purpose of clarifying the following description is designated P, is in the initial vertical position for the reception of a nib, that the locking rod 105 engages a slot 64 in the turret 10, that the cup 25 is in the raised position, the centering rod 96 retracted, the nib-withdrawing device 79, 80 also retracted, the hopper plunger 27 lowered, and that the pawl 17 of the ratchet device 16 in its lower inoperative position. Let it also be assumed that the apparatus is being used for the first time and that there is no tip present in the cup 25.

A tip 23 is first placed by hand in the cup 25 and a nib in the clamp P. The switches 124 and 130 are then closed. The motor 2 starts and sets the main driving shaft 9 in operation. The pawl 17 is thus moved upwardly to operative position and during this time the locking rod 105 is withdrawn against the action of its spring 108 by its operating cam 92, the member 40 is swung downwardly against the action of the springs 45 to lower the cup 25 by means of the operating cam 22, and the cup, when it reaches its lowermost position, is displaced laterally by the cam surface 87 on the shaft 6. At the same time, the pawl 17 is again moved downwardly, and by engagement with the ratchet 16, rotates the turret 10 through an angle of 60° in a clockwise direction, as seen from the front of Figure 2, so that the nib-carrying clamp P takes up the position marked A thereon. During this movement the clamp P is allowed to close as the movable jaw 70 rides off the fixed cam 75 and remains closed until a later period, as hereinafter described. The cup-centering rod 96 is allowed to move forward under the action of its spring 99 for the purpose of centering the cup 25, but as there is as yet no nib in the adjacent clamp 66, 70, the cup 25 and the arm 43 will be displaced to the left beyond the centre until the arm 53 engages beneath the fixed stop 54. The cup 25 is thus prevented from rising.

During the rotary movement of the turret 10, the cam 84 has been rotated to a position to allow the arm 77 to swing under the action of its spring 85 towards the turret 10 so as to bring the withdrawing jaws 79, 80 into proximity to a clamp for the purpose of gripping a nib, when one is present therein, further rotation of the cam 84 withdrawing the said jaws. At the same time the aforesaid cam 21 raises the plunger 27 against the action of the spring 28 through the mass of tips 23 in the hopper 24, one of which falls into and is retained in the groove 35, whilst the remainder fall back into the pile over the conical surface 34. The lateral movement of the arm 43 beyond the centre position causes the slot 61 in the slide 60 (Figure 5) to move also beyond the registering position with the hopper outlet, with the result that the outlet is closed by the slide 60 and the tip 23 is retained in the groove 35.

On continued rotation of the shafts 6 and 9, and whilst the turret 10 remains stationary, the cam 87 on the shaft 6 again acts to displace the cup 25, which, as stated above, has in this initial stage, remained in the lowered position thereof, to the left as previously described and then the pawl 17, which, by this time has risen again, once more engages the ratchet 16 and, on continued rotation of the shaft 9, rotates the turret through a further 60° to cause the nib-carrying clamp P to reach position B. The above described sequence of operations again takes place.

On the next intermittent rotation of the turret 10, the clamp P, with protruding nib, which is not shown in Figure 2, arrives in the vertical position C above the cup 25. Owing to the presence of the nib, the cup 25 has not been displaced as far to the left as previously, but the movement of the centering rod 96 has been limited by the contacting of the finger 102 with the nib, which now lies in its path of movement. As a result, the lateral movement of the cup 25 has stopped at a position vertically beneath the nib axis. There is, therefore, now nothing to prevent the member 40 carrying the cup 25 from rising under the action of its springs 45, with the result that the tip 23, lying in the cup 25, is brought into contact with the nib. The welding circuit switch 130 having already been closed, and the aforesaid contact breakers 128 and 129 also being closed at this time, the welding circuit is closed and a low voltage current passes which welds the tip to the nib. Continued rotation of the driving motor 2 and the various shafts driven thereby, as above described, causes the contact breakers 128 and 129 to open, thereby breaking the welding circuit. The sequence of operations first above described is repeated and the clamp P with completed nib moves to position D and then to position E. As the clamp approaches the position E, the movable jaw 70 again rides over the cam 75 to open the clamp and the welded tip on the protruding nib end comes into contact with the withdrawing jaws 79 and 80 and pivots the jaw 80 in an opening direction against the action of the spring 82. The tip is thus gripped in the jaws 79 and 80 and on the subsequent retraction of the arm 77 the nib is withdrawn from the clamp P. During the retracting movement, the bevelled edge 80a of the jaw 80 rides over the fixed pin 80b and the jaw is swung in an opening direction, whereby the nib is released and falls into the chute 83.

As previously pointed out, the operation of centering or aligning the cup, also causes the movement of the slide-bar 60 controlling the outlet 36 from the hopper 24. The slot 61 in the bar 60 is so positioned that when, during normal operation of the apparatus, the cup 25 is accurately aligned with respect to the axis of a nib, the said slot 61 registers with the hopper outlet 36. As a result, a tip 23, which has become positioned in the groove or recess 35 of the plunger, is allowed to fall down the pipe 37 where it comes to rest against the side of the cup 25. On the subsequent downward movement of the cup 25, the tip 23 falls into position in the cup ready for the next operation.

After the nib has been withdrawn, the turret 10 is further rotated to bring the clamp P back to its initial starting position ready to receive a further nib blank.

The whole apparatus is, advantageously, enclosed in a readily detachable cover.

Whilst, in the above, the operation of the apparatus has been described on the assumption that a nib blank has been placed in only one clamp P, it will be readily understood that, during normal continuous operation, a nib blank is placed in each clamp as it attains the top vertical position, so that, when the first nib blank has reached the welding position, a nib blank is already held by the next two succeeding clamps located at the 60° and 120° positions respectively, and that, during the welding operation a further blank is being placed by the operator in the uppermost clamp. When the clamp P is returned to the initial position, and a new blank is placed therein, there will be six nib blanks carried by the turret 10. Thus, during continuous operation, the insertion of a new nib blank in an empty clamp occurs simultaneously with the welding of a tip to an earlier inserted nib blank and with the withdrawal of a completed blank, inserted at a still earlier stage.

The number of blanks which can be operated upon per minute depends on the speed of the operator and, whilst the apparatus is capable of welding about 50 tips per minute, it will be found in practice that the human element will limit this capacity to about 30–35 welds per minute.

In a modified construction of apparatus embodying the features of the invention, the tip-supporting cup 115, instead of being mounted and operated in the manner above described, is carried by one end of a rod pivotally mounted intermediate its ends on brackets secured to the frame, the other end of the rod being normally spring urged in a direction to cause the cup to assume its uppermost position immediately beneath a nib carrying clamp in welding position. The rod is pivoted downwardly against the action of the spring by means of a lever pivoted to the rear of the front frame and disposed at right angles to the cup-carrying rod, one end of which lever bears on the upper side of the said rod adjacent the forward end thereof and the other end of which is engaged by the upper end of a vertical rod slidably mounted in bearings fixed to the front frame and movable against the action of a spring in an upward direction by means of a cam mounted on, and rotatable with, the aforesaid operating shaft. The configuration of the cam is such that the cup is depressed below its normal position by the cam and is then moved upwardly to normal position.

Moreover, the supply of tips from the hopper, instead of being controlled by the plunger 27 actuated by the control cam 21 on the drive shaft, may be controlled electrically by means of a solenoid actuated by a nib blank as it reaches an intermediate stationary position before the welding position. For this purpose, a fixed cam plate included in the solenoid circuit is located adjacent the periphery of the turret at a position corresponding to the 120° rest position of a clamp, with which a nib blank held in the clamp and also included in the said solenoid circuit, contacts, thereby temporarily closing the circuit. The solenoid is connected to a hopper outlet control slide, which slide is formed with a slot, which on the actuation of the slide is moved first to a position immediately beneath the hopper outlet to allow of a tip to fall therein and then into register with an outlet passage or delivery chute leading to the aforesaid cup.

Furthermore, the nib withdrawing device 79, 80, described above may, if desired, be dispensed with, and the completed nib blank may be positively ejected from the holding jaws 70 and 66, after rotation of the jaws past the vertical welding position. For this purpose each nib-clamp may comprise a fixed jaw member, formed as above described, by an upward radial extension of the turret, and a cooperating pivoted jaw formed as a bell crank lever, one arm of which constitutes a jaw member and the other arm of which is normally influenced by a spring, mounted on the turret body in a clamp closing direction. The turret body also carries a leaf spring which is stressed by the entering nib and kept under stress when the jaws are closed. On the release of the clamp, in the manner above described, the spring acts to eject the nib into a receptacle.

It will be appreciated that other modifications may be made in the details without departing from the scope of the invention. For example, any desired number of clamps, other than six, may be provided on the turret.

What we claim is:

1. Welding apparatus comprising the combination of a rotatable turret; at least one base-holding device on said turret; a displaceable tip-supporting device and a base-withdrawing means associated with said turret and arranged externally of and at spaced positions around the periphery of said turret; a welding circuit including said base-holding device and said tip-supporting device; and common operating means for moving said base-holding device progressively to each of said positions in turn and for effecting displacement of said tip-supporting device when said base-holding device reaches the first position to bring a tip carried by said support into contact with a base and close the welding circuit and for actuating said withdrawing means to allow said base to be withdrawn from said holding device when the latter reaches the second position.

2. In a welding apparatus, the combination with a rotatable base-supporting turret, means for intermittently rotating said turret, and reciprocable base-withdrawing means operatively associated with said turret; of a reciprocable tip-supporting device also operatively associated with said turret for movement towards and away from said turret, said device comprising a horizontally pivoted and vertically reciprocable arm located beneath said turret; a tip-supporting cup carried by said arm; spring means for normally maintaining said arm in its lowermost position and cam actuated arm-raising means operatively associated with said turret-rotating means and operative at predetermined intermediate stationary positions of said turret.

3. In a welding apparatus the subcombination of a rotatable support; at least one base-supporting device on said support; driving means including means for imparting a step-by-step rotation to said support; a movable tip-supporting device associated with said support; means operable by said driving means in one intermediate stationary position of said support to cause said tip-supporting device to approach said support; a tip-containing hopper associated with said tip-supporting device; and tip-releasing means operatively associated with said hopper and said driving means and adapted to feed one tip at a time from said hopper to said tip-supporting device in said intermediate position of rotation of said support.

4. In a welding apparatus the subcombination of: a rotatable support, at least one base-supporting device on said support; driving means, including means for imparting a step-by-step rotation to said support; a movable tip-supporting device associated with said support; means operable by said driving means, in one intermediate stationary position of said support, to cause said tip-supporting device to approach said support; a tip-containing hopper associated with said tip-supporting device, said hopper having an opening in the bottom thereof and a feed outlet in one side wall thereof; a reciprocable plunger located in said hopper, said plunger being reciprocable between the level of said open bottom and said feed outlet and plunger-movement control means operable by said driving means.

5. In a welding apparatus, the subcombination of: a rotatable support; at least one base-holding device on said support; driving means, including means for imparting a step-by-step rotation to said support; a movable tip-supporting device associated with said support; means operable by said driving means, in an intermediate stationary position of said base-holding device, to cause said tip-supporting device to approach said base-holding device and centering mechanism operatively associated with said driving means and cooperable with both said tip-supporting and said base-holding devices accurately to align said tip-supporting device with respect to said base-holding device.

6. In a welding apparatus, the subcombination of: a rotatable support; at least one base-holding device on said support; driving means, including means for imparting a step-by-step rotation to said support; vertically reciprocable and laterally displaceable tip-supporting means associated with said support, said means being normally located vertically axially beneath the axis of rotation of said rotatable support; means operable by said driving means, in one intermediate stationary position of said base-holding device, to cause said tip-supporting means to approach said device; automatic means operable to displace said tip-supporting means laterally to one side of said vertical axis; a reciprocable arm located in the plane of lateral movement of said tip-supporting means; two spaced projecting fingers on said arm, one adapted to engage said tip-supporting means and the other adapted to engage a base in said base-holding device, said fingers being so relatively disposed and of such relative dimensions that, when said fingers engage said tip-supporting means and said base, said tip-supporting means is accurately located with respect to said base; and means for moving said arm laterally in a direction towards said vertical axis and for subsequently withdrawing same.

7. Means for accurately aligning the path of reciprocation of a reciprocable element with respect to the axis of a member bodily movable through a predetermined path, passing through the plane of reciprocation, and temporarily coming into said path of reciprocation, said means comprising a bearing; a vertically reciprocable supporting arm pivotally mounted in said bearing; a laterally swingable member carried by said support and on which said element is mounted, and a laterally movable locating device associated with said member, said device including two projecting fingers, one adapted to engage the movable member when it comes into the path of reciprocation of said reciprocable element and the other adapted to engage said element, said fingers being so relatively disposed and of such relative dimensions that, when in contact with said element and said member respectively, the former is accurately positioned with respect to the latter; means for initially laterally displacing said reciprocable element towards said locating device; and cam-controlled means for moving said locating device in the opposite direction whereby said device first engages said element and then said movable member.

8. In a welding apparatus, the combination with a rotatable base-supporting turret and means for rotating said turret, of a reciprocable tip-supporting device operatively associated with said turret, said device comprising a horizontally pivoted and vertically reciprocable arm located beneath said turret; a tip-supporting cut carried by said arm; spring means for normally maintaining said arm in its lowermost position and means, operatively associated with said turret-rotating means, for raising said arm and tip-supporting cup towards said turret.

9. In a welding apparatus, the combination with a rotatable turret, at least one base-holding device on said turret and means for intermittently rotating said turret, of reciprocable base-withdrawing means associated with said turret and movable towards and away from said turret, said means comprising a pivot, an upstanding arm pivoted at one end thereof to said pivot, a spring normally urging said arm towards said turret, a pair of relatively movable jaw members mounted on said arm at the other end thereof, resilient means for normally maintaining said jaws closed, but operable to allow of the opening thereof when said jaws come into contact with a base on said turret, cam means operatively associated with said turret-rotating means for swinging said arm against the action of its spring in a base-withdrawing direction away from said turret, and means operative during movement of said arm in a withdrawing direction positively to open said jaws to release a base carried thereby.

10. In a welding apparatus, the sub-combination of a rotatable turret; at least one base-supporting device on said turret; a movable tip-supporting device; a tip-containing hopper associated with said turret and tip-releasing means associated with said hopper for feeding one tip at a time from said hopper to said tip-supporting device.

11. In a welding apparatus, the sub-combination of a rotatable turret; at least one base-supporting device on said turret; a tip-supporting device and a tip-containing hopper associated with said tip-supporting device, said hopper having an opening in the bottom thereof and a feed outlet in one side wall thereof; a reciprocable plunger located in said hopper and reciprocable between the level of said open bottom and said feed outlet and means for controlling the movement of said plunger.

12. In a welding apparatus, the sub-combination with a horizontally rotatable turret and at least one base-holding device on said turret, of reciprocable base-withdrawing means movable in a non-linear path towards and away from said turret in the plane of rotation of said base-holding device, said means including a pair of relatively movable spring actuated jaws adapted on movement of said withdrawing means in one direction partly to embrace and grip a base, and a fixed pin located in the path of movement of said jaws for positively opening said jaws, during movement thereof away from said turret, to release a base carried thereby.

NORMAN ALBERT TUCKER.
JOHN ERNEST WALL.

REFERENCES CITED

The following references are of record in the file of this patent:

UNITED STATES PATENTS

| Number | Name | Date |
|---|---|---|
| 1,913,029 | Holmes | June 6, 1933 |
| 2,154,243 | Laughans | Apr. 11, 1939 |
| 2,254,494 | Rabezzana | Sept. 2, 1941 |
| 2,308,658 | Jendresen | Jan. 19, 1943 |